(12) United States Patent
Fincher

(10) Patent No.: US 9,592,711 B2
(45) Date of Patent: Mar. 14, 2017

(54) TOWING ASSEMBLY WITH PIVOT JOINTS

(71) Applicant: Defense Products and Services Group Holding Company, Fredericksburg, VA (US)

(72) Inventor: Charles Kennith Fincher, Fredericksburg, VA (US)

(73) Assignee: Defense Products and Services Holding Company, Fredericksburg, VA (US)

(*) Notice: Subject to any disclaimer, the term of this patent is extended or adjusted under 35 U.S.C. 154(b) by 0 days.

(21) Appl. No.: 14/955,304

(22) Filed: Dec. 1, 2015

(65) Prior Publication Data

US 2016/0082796 A1   Mar. 24, 2016

Related U.S. Application Data

(63) Continuation-in-part of application No. 14/666,722, filed on Mar. 24, 2015, and a continuation-in-part of application No. 14/666,740, filed on Mar. 24, 2015, and a continuation-in-part of application No. 13/684,714, filed on Nov. 26, 2012, now Pat. No. 8,985,612, which is a continuation of application No. 13/076,520, filed on Mar. 31, 2011, now Pat. No. 8,353,522.

(51) Int. Cl.
| | |
|---|---|
| *B60D 1/54* | (2006.01) |
| *B60D 1/44* | (2006.01) |
| *B60D 1/01* | (2006.01) |
| *B60D 1/167* | (2006.01) |
| *B60D 1/04* | (2006.01) |

(52) U.S. Cl.
CPC ............. *B60D 1/1675* (2013.01); *B60D 1/04* (2013.01); *B60D 1/54* (2013.01)

(58) Field of Classification Search
CPC ........... B60D 1/40; B60D 1/44; B60D 1/1675
USPC .... 280/474, 491.1, 491.2, 491.3, 491.4, 493
See application file for complete search history.

(56) References Cited

U.S. PATENT DOCUMENTS

| | | | | |
|---|---|---|---|---|
| 4,869,521 A * | 9/1989 | Johnson | ..................... | B60D 1/54 280/491.1 |
| 5,232,240 A * | 8/1993 | Johnson | ..................... | B60D 1/54 280/491.4 |
| 5,429,382 A * | 7/1995 | Duncan | ..................... | B60D 1/54 280/491.4 |
| 5,957,477 A * | 9/1999 | Ensz | ..................... | B60D 1/155 280/482 |
| 7,506,889 B2 * | 3/2009 | Baltrusaitis | ............... | B60D 1/04 224/515 |
| 7,942,435 B1 * | 5/2011 | Huston | ..................... | B60D 1/04 280/493 |
| 8,353,522 B2 * | 1/2013 | Helland | ............... | B60D 1/1675 280/491.1 |
| 2006/0249926 A1 * | 11/2006 | Smith | ..................... | B60D 1/167 280/491.1 |
| 2007/0001425 A1 * | 1/2007 | Helms | ..................... | B60D 1/52 280/456.1 |

* cited by examiner

*Primary Examiner* — Tony Winner
(74) *Attorney, Agent, or Firm* — Laurence P. Colton; Smith Tempel Blaha LLC

(57) ABSTRACT

A towing assembly that may convert from an articulated assembly extracting a vehicle in an inaccessible location to a rigid assembly for safely towing a vehicle on a road, the assembly having locking pivot joints.

45 Claims, 12 Drawing Sheets

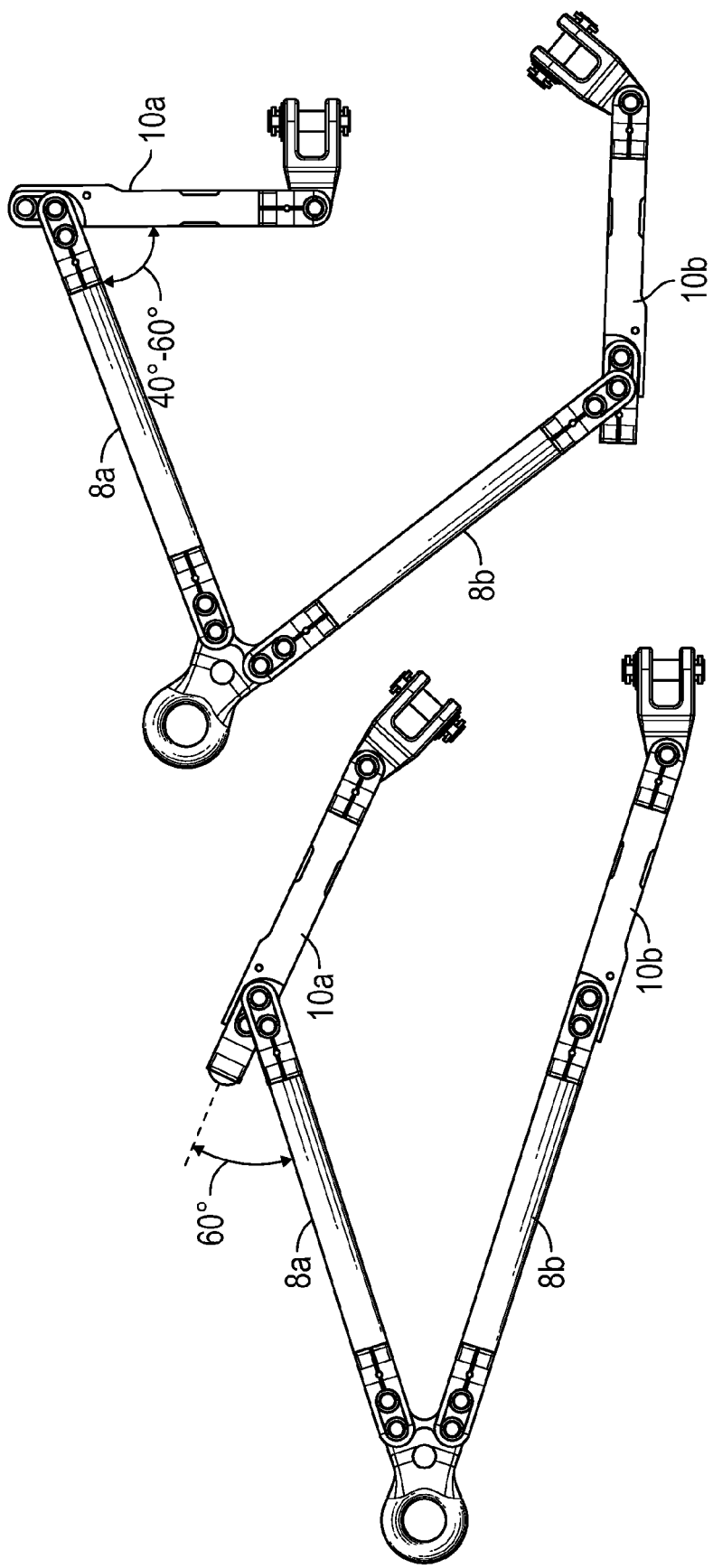

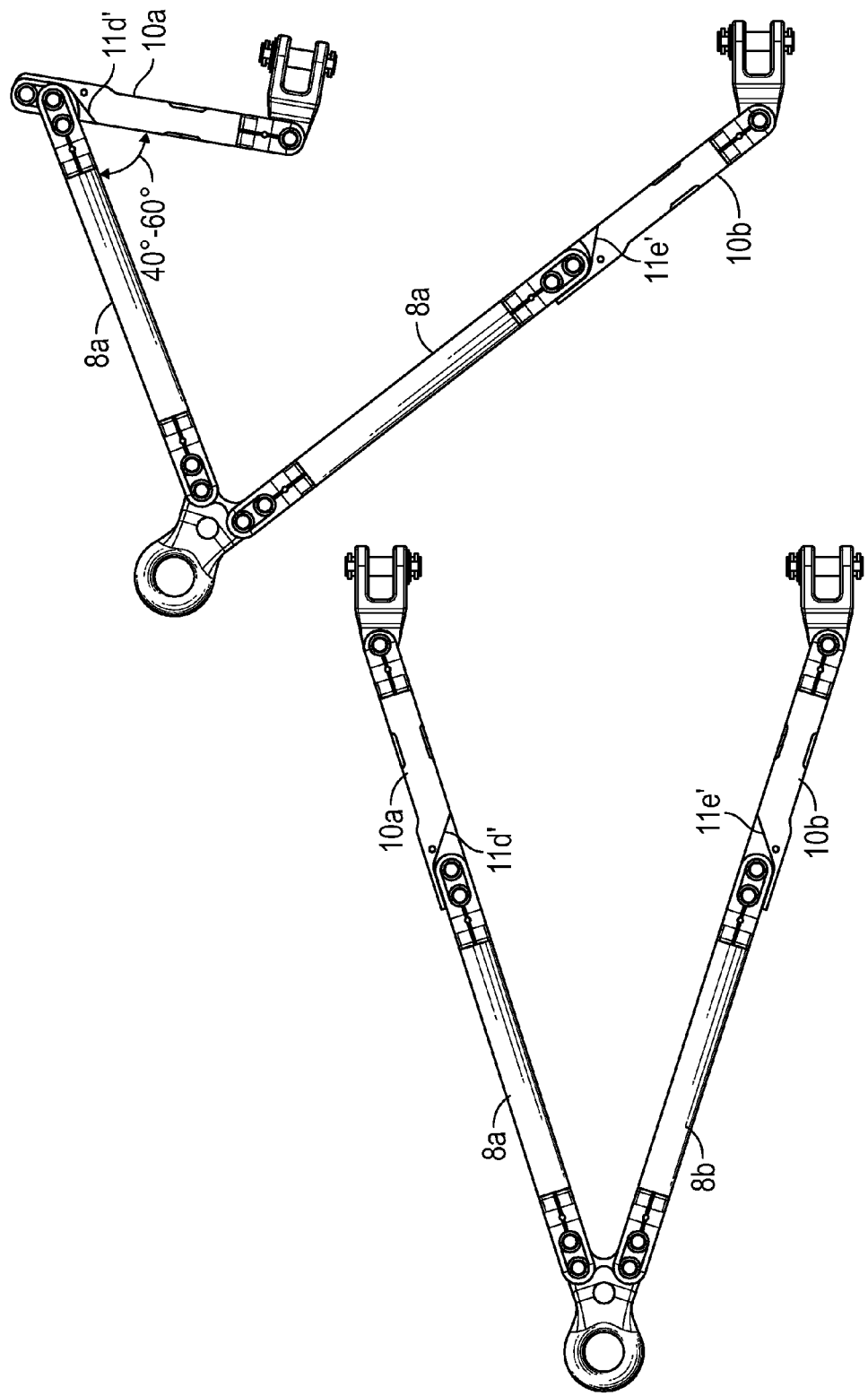

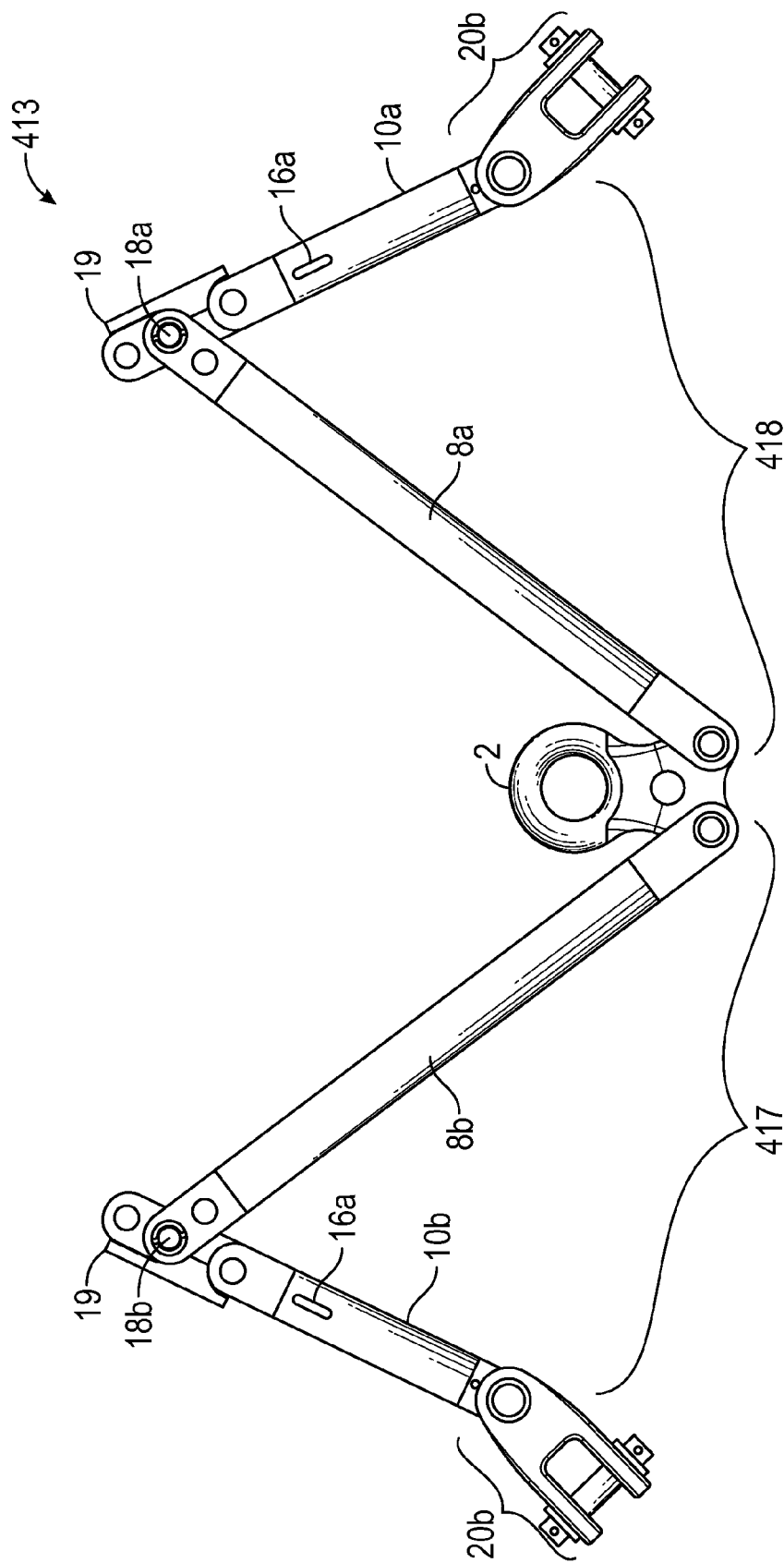

TOWING ASSEMBLY WITH PIVOT JOINTS

STATEMENT OF RELATED APPLICATIONS

This patent application is a continuation-in-part of pending U.S. patent application Ser. No. 14/666,722, having a filing date of 24 Mar. 2015, a continuation in part of pending U.S. patent application Ser. No. 14/666,740, having a filing date of 24 Mar. 2015, and a continuation-in-part of U.S. patent application Ser. No. 13/684,714, having a filing date of 26 Nov. 2012, which issued as U.S. Pat. No. 8,985,612 on Mar. 24, 2015, which is a continuation of U.S. patent application Ser. No. 13/076,520 having a filing date of 31 Mar. 2011, which issued as U.S. Pat. No. 8,353,522 on 15 Jan. 2013.

BACKGROUND OF THE INVENTION

Field of the Invention

The present invention generally relates to a towing assembly or tow bar, and more specifically to a towing assembly that is convertible from an articulating assembly for more easily extracting a vehicle from a less accessible location to a rigid assembly for more safely towing a vehicle on a road.

Description of the Related Art

Assemblies for towing vehicles require many, often competing functions. As in many designs, in order to maximize the functionality of one operation there is often a concomitant reduction in the functionality of another operation. For example, in order to extract vehicles from a less accessible location, such as a ditch, it is preferable to have a supple and/or flexible assembly to reach the ditched vehicle. Such assemblies are often woven fabric, multi-strand cable, or other substantially tensile structures. However, after extraction, when towing the vehicle on a road, it is preferable to have a rigid assembly to more securely affix the towed vehicle to the towing vehicle. Such assemblies are often of rigid, and preferably triangular, shape. However, such rigid assemblies, although safer for towing on the road, are of far less use in the extraction process. There is therefore a great need in the art for a towing assembly that can both reach difficult locations and still safely tow the extracted vehicle.

BRIEF SUMMARY OF THE INVENTION

According to one aspect of the invention, the towing assembly comprises a hitch and a pair of members pivotally attached to the hitch. Each member has a first shaft, a second shaft, and a locking joint therebetween, with the first and second shafts being attached to and lockable directly to each other. By having an assembly that may convert from one that articulates to one that is rigid, and that may be automatically locked in the desired position, safer storage, use, and towing can be achieved with heretofore unrealized results.

According to another aspect of the invention, the towing assembly comprises a lunette, a first shaft attached at one end to the lunette, a second shaft attached at one end to the lunette, a third shaft attached at another end directly to the first shaft, and a fourth shaft attached at another end directly to the second shaft. The first and third shafts are lockable directly to each other, and the second and fourth shafts are lockable directly to each other.

According to yet another aspect of the invention, the towing assembly comprises a lunette, a first hollow shaft attached at one end to the lunette, a second hollow shaft attached at one end to the lunette, a first elbow joint of C-channel cross-section attached to the first shaft at another end, a second elbow joint of C-channel cross section attached to the second shaft at another end, a third hollow shaft attached at one end to the first elbow joint, and a fourth hollow shaft attached at one end to the second elbow joint. The first and third shafts are lockable to the first elbow joint whereby the first and third shafts are lockable relative to each other, and the second and fourth shafts are lockable to the second elbow joint whereby the second and fourth shafts are lockable relative to each other.

According to still another aspect of the invention, the towing assembly comprises a hitch and a pair of members attached to the hitch. Each pair of members has two shafts joined to one another, and which may be locked directly to each other in collinear fashion. The pair of members may be locked for rigidly securing the orientation thereof with respect to the hitch.

Additional objects of the present invention will become apparent from the following description. The method and apparatus of the present invention will be better understood by reference to the following detailed description of preferred embodiments and the attached figures which illustrate and exemplify such embodiments.

BRIEF DESCRIPTION OF THE DRAWINGS

Specific illustrative embodiments of the present invention will be described with reference to the following drawings, wherein:

FIG. 3A is a top view of a first embodiment of the towing assembly in a first partially unfolded position FIG. 3B is a top view of a first embodiment of the towing assembly in a second partially unfolded position.

FIG. 3C is a top view of a second embodiment of the towing assembly in a locked, unfolded position FIG. 3D is a top view of a second embodiment of the towing assembly in a partially unfolded position.

FIG. 4C is a top view of a fifth embodiment of the towing assembly in a partially folded position.

DETAILED DESCRIPTION OF PREFERRED EMBODIMENTS

Figure 1:
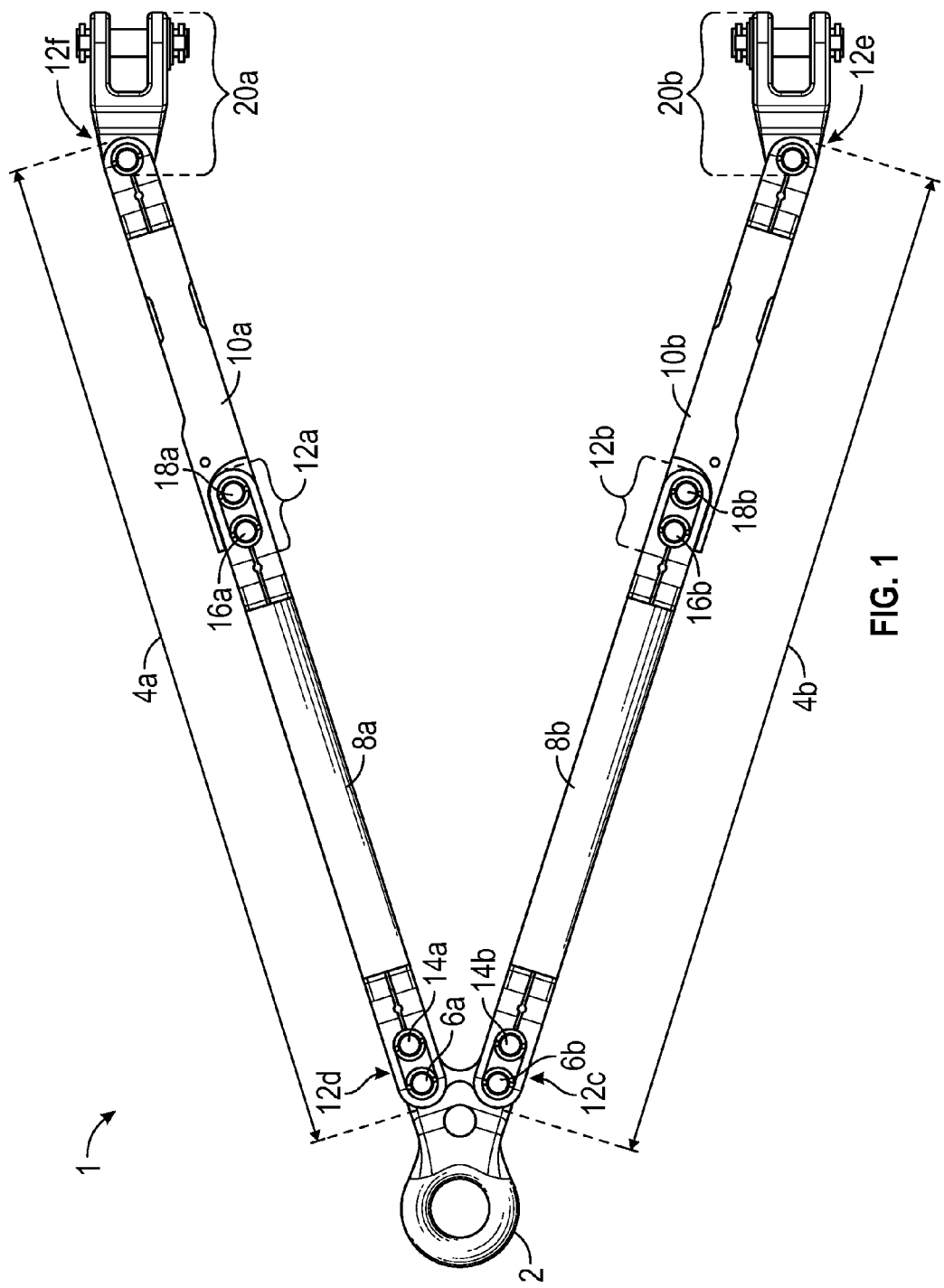
FIG. 1 is a top view of a first embodiment of the towing assembly in its extended position.

The following preferred embodiments as exemplified by the drawings are illustrative of the invention and are not intended to limit the invention as encompassed by the claims of this application.

The towing assembly 1, as illustrated generally in FIGS. 1-4, in one preferred embodiment, can be used for attaching two vehicles to each other, such as for example extracting an immobilized vehicle and then towing it. The towing assembly 1 preferably is made of steel or other high strength material(s), of either solid or hollow elements. The towing assembly comprises a hitch 2, also referred in the industry as a lunette, and a pair of two-piece members 4a, 4b. The hitch 2 is typically of a toroidal shape for engagement with a pintle hook or tow ball (not shown) attached to a towing vehicle. The hitch may be of a variety of types for such engagement, as is known to those of ordinary skill in the art. Attached to the hitch 2 are the two members 4a, 4b. Members 4a, 4b are each pivotally attached to the hitch 2 by a pin 6a, 6b, respectively. In one embodiment, the pin 6a, 6b pivotally attaching the members 4a, 4b to the hitch 2 is a threaded bolt having a nut to secure it. In other embodiments, the pin 6a, 6b may be a cotter pin or a bolt threaded into the hitch 2 itself. In still other embodiments, a spring loaded detent mechanism may be used. Multiple types of attachments may be used to pivotally attach the members 4a, 4b to the hitch 2.

The two members 4a, 4b are preferably symmetrical with each other and accordingly member 4a has two shafts 8a, 10a with a joint 12a therebetween and member 4b has two shafts 8b, 10b with a joint 12b therebetween. It is the shafts 8a, 8b of members 4a, 4b, respectively that are pivotally attached to the hitch 2. The orientation of the attachment of the members 4a, 4b to the hitch 2 may be fixed in place by a locking mechanism 14a, 14b, respectively. In one embodiment, the locking mechanism 14a, 14b fixing the orientation of the members 4a, 4b to the hitch 2 is a threaded bolt having a nut to secure it. In other embodiments, the locking mechanism 14a, 14b may be a cotter pin or a bolt threaded into the hitch 2 itself. In still other embodiments, a spring loaded detent mechanism may be used. In still other embodiments, the locking mechanism 14a, 14b and the joint 12a, 12b upon which it acts may be configured for a specialized automatic/automated locking mechanism. Multiple types of locking mechanisms 14a, 14b, automated locking mechanisms, and automated operating mechanisms may be used to lock the orientation of the members 4a, 4b to the hitch 2 and to manipulate components of the towing assembly 1.

Each of the two sets of shafts 8a, 10a and 8b, 10b of each of the members 4a, 4b are attached to one another by the joint 12a, 12b, respectively. The joints 12a, 12b also may be used to lock the orientation of each of the respective shafts 8a, 10a and 8b, 10b in an aligned position. In one embodiment, the locking joints 12a, 12b fixing the orientation of the shafts 8a, 10a and 8b, 10b to each other each have pins 16a, 18a and 16b, 18b. In other embodiments, the pins 16a, 16b and 18a, 18b may be threaded bolts each having a nut to secure it. In yet other embodiments, the locking mechanism may be a cotter pin or a bolt threaded into the joint itself. In still other embodiments, a spring loaded detent mechanism may be used. Multiple types of locking mechanisms may be used to lock the orientation of the shafts 8a, 10a and 8b, 10b relative to each other.

Ends of the shafts 10a, 10b, for example, may have at least one shoulder 11a, 11b, 11c, 11d, 11d', 11e' structure. Shoulders 11a, 11b may prevent the aligned shafts 8a, 10a, 8b, 10b from rotating past an aligned position from a folded position. Similarly, shoulders 11c, 11d may prevent shafts 8a, 10a, 8b, 10b from folding beyond a certain angle relative to each other. Although an angle of approximately 65 degrees is shown, this is for illustrative purposes. Shoulders 11a, 11b, 11c, 11d, 11d', 11e' extend somewhat upwards or away from shafts 10a, 10b whereby a portion of shafts 8a, 8b can contact shoulders 11a, 11b, 11c, 11d, 11d', 11e' thereby preventing shafts 8a, 8b from rotating about joint 12a, 12b relative to shafts 10a, 10b, more than a set distance. In this manner, shafts 8a, 8b can be forced to align with shafts 10a, 10b in a linear manner. In an alternative embodiment, and with reference to FIG. 3C and FIG. 3D, shoulders 11d', 11e' may allow shafts 8a, 10a and 8b, 10b to fold more than about 65 degrees relative to each other. Such an alternative embodiment increases the range of articulation of the assembly.

The aligned position, specifically shown in FIG. 1, allows the towing assembly 1 to form a substantially equilateral or isosceles triangle when the towing assembly 1 is in its extended position. Typically, this aligned position may be achieved when tensile force is substantially equally applied to each pair of shafts 8a, 10a and 8b, 10b of each pair of members 4a, 4b.

When each of the pins 14a, 14b, 16a, 16b are disengaged from their respective joints 12d, 12c, 12b, 12a, the towing assembly 1 may articulate from its extended aligned position through intermediate positions illustrated in FIG. 3A and FIG. 3B, to a folded position. When the towing assembly 1 is in a fully folded position, each pair of shafts 8a, 10a and 8b, 10b of each member 4a, 4b preferably is substantially parallel to each other.

Attached to the end of shafts 10a, 10b opposite joints 12a, 12b, are attaching mechanisms 20a, 20b for attachment to a vehicle to be towed. Many types of such mechanisms 20a, 20b may be used, for example, shackles, eye bolts, or universal joints, as is well known to those skilled in the art.

Figure 2:
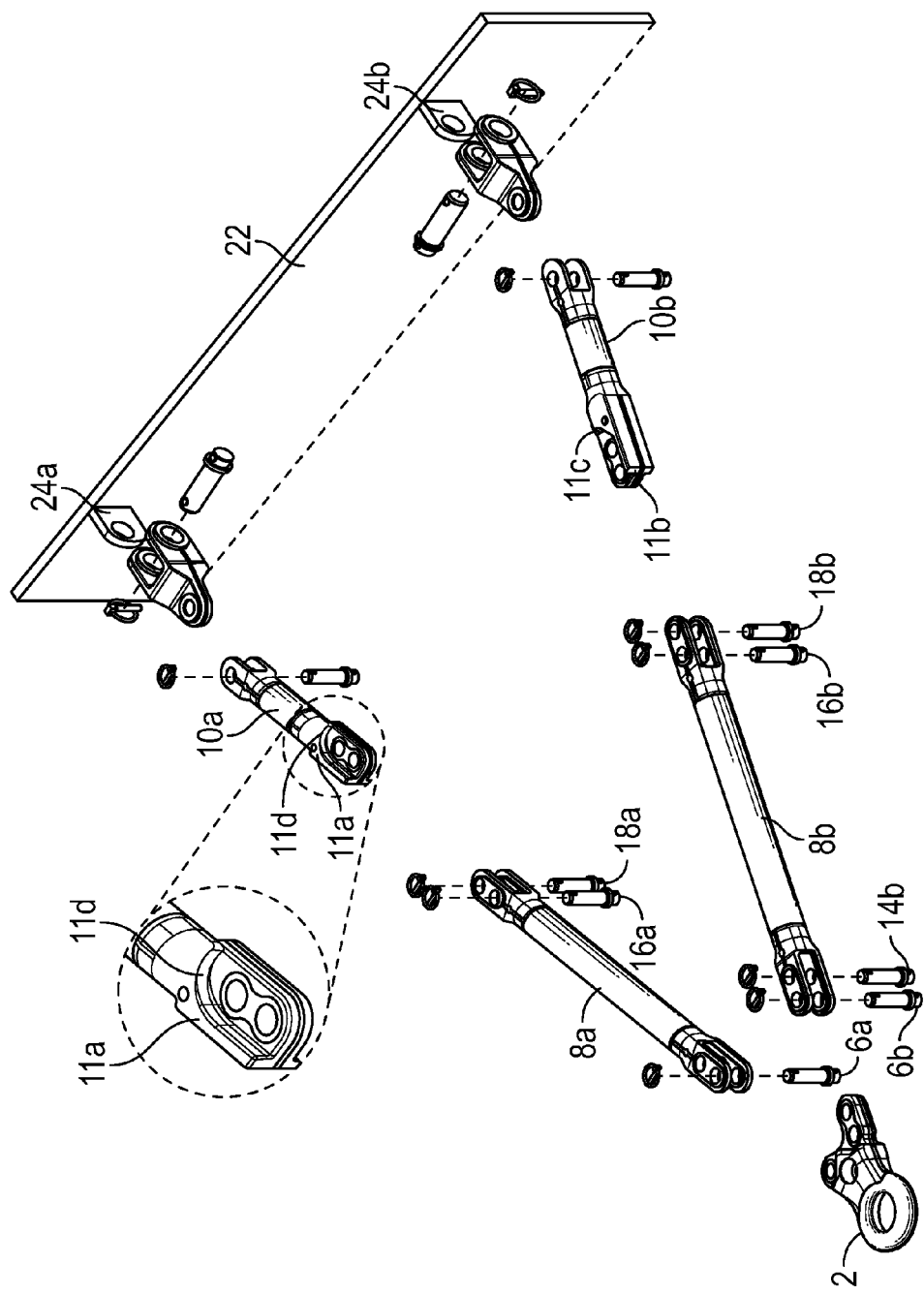
FIG. 2 is an exploded view of a first embodiment of the towing assembly in its extended position.

FIG. 2 depicts the towing assembly 1 attached to a bumper 22 of a vehicle to be towed. As shown, the bumper 22 has two attaching devices 24a, 24b for mating with the attaching mechanisms 20a, 20b, respectively. Until the locking pins 14a, 14b, 16a, 16b, 18a, 18b are in engagement with their respective joints 12a, 12b, 12c, 12d, the towing assembly 1 may articulate for ease of attachment to an otherwise inaccessible vehicle.

FIGS. 2, 4A, 4B, 4C depict the towing assembly 1 that may be attached to a bumper 22 of a vehicle, in various folded positions. In these embodiments, the bumper 22 of the vehicle to which the towing assembly 1 is attached is the towing vehicle. Accordingly, when not in use, it is preferable to have the towing assembly 1 in its folded position. In this embodiment, it is the hitch 2 that is used to attach to the vehicle to be towed.

Thus, although made of rigid components, via joints 12a, 12b, 12c, 12d, 12e, 12f, the towing assembly 1 can articulate through a wide range of motion. This allows attachment to a vehicle when the vehicle is in a difficult position for access. For example, when extricating a ditched vehicle, a towing vehicle can be maneuvered close to the ditched vehicle, and the towing assembly 1 articulated so as to be able to be attached to the ditched vehicle, preferably by a hitch 2. Then, after the ditched vehicle has been extracted from its immobilized position, the towing assembly 1 can be moved from its articulated position (e.g., FIG. 3B) to its fully extended position (FIG. 1). Having moved into its fully extended, substantially equilateral or isosceles triangular configuration (FIG. 1), all of the shafts 8a, 10a, 8b, 10b can be locked into their respective locking joints 12a, 12b so that the towed vehicle can be more safely towed along a thoroughfare.

Figure 4A:
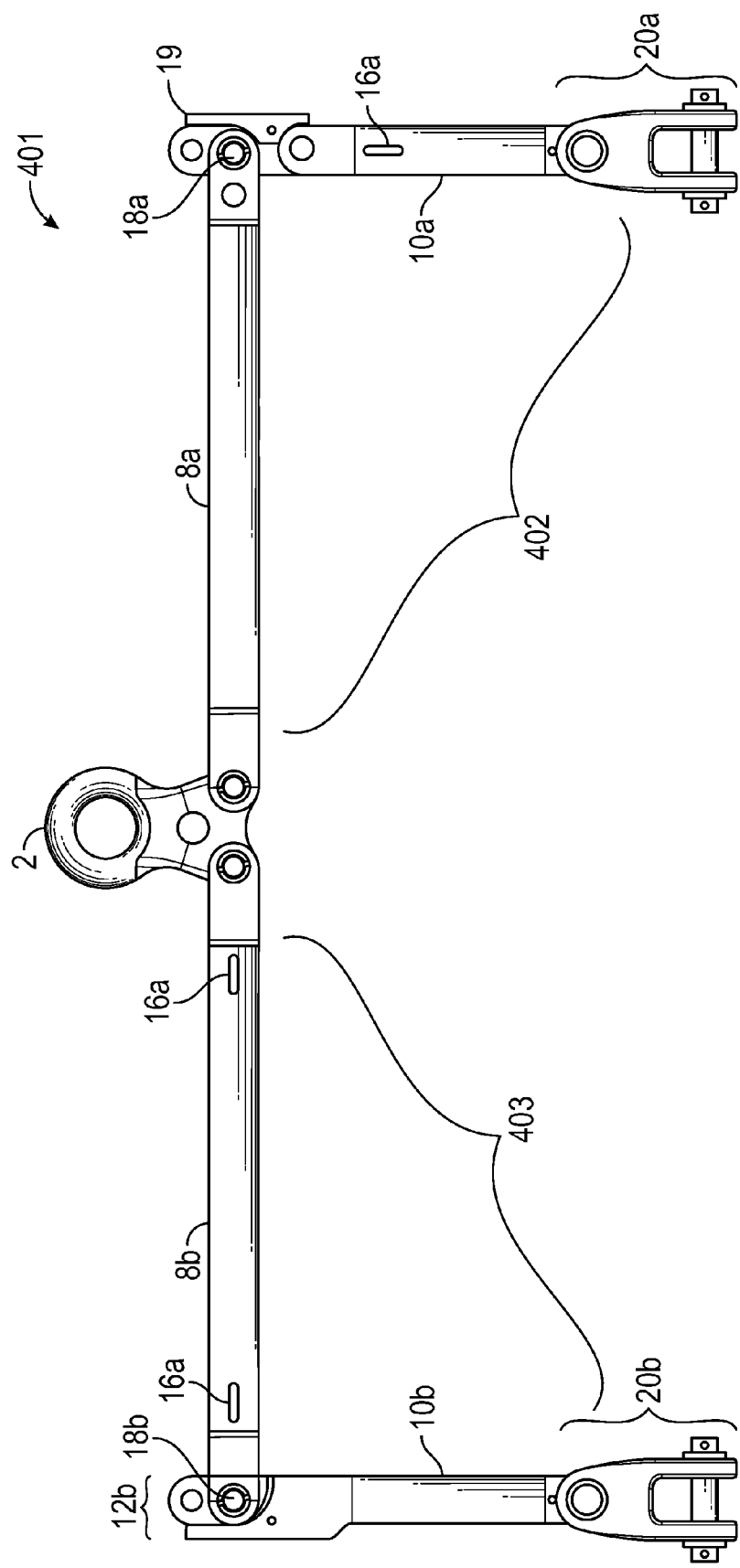
FIG. 4A is a top view of a third embodiment of the towing assembly in a partially folded position.

In a third embodiment, and as generally shown in FIG. 4A, a towing assembly 401 includes member 402 comprising shaft 8a and shaft 10a joined by joint 12a, at elbow 19 and, member 403 comprising shaft 8b and shaft 10b joined by joint 12b, which joint 12b includes locking mechanism 16a. In this embodiment, shaft 10a includes locking mechanism 16a that locks elbow 19 in line with shaft 10a. Elbow 19 is a separate structure pivotally connected to and between shaft 8a and shaft 10a. As shown, shaft 8b includes locking mechanism 16a that locks shaft 8b to shaft 10b. In an optional variation of the third embodiment, shaft 8b and/or shaft 8a may be joined to lunette 2 by locking mechanism 16a. The various locking mechanisms 16 can be included with or excluded from, each of the shafts 8a, 8b, 10a, 10b, and joints 12a, 12b, with, or without elbows 19.

Figure 4B:
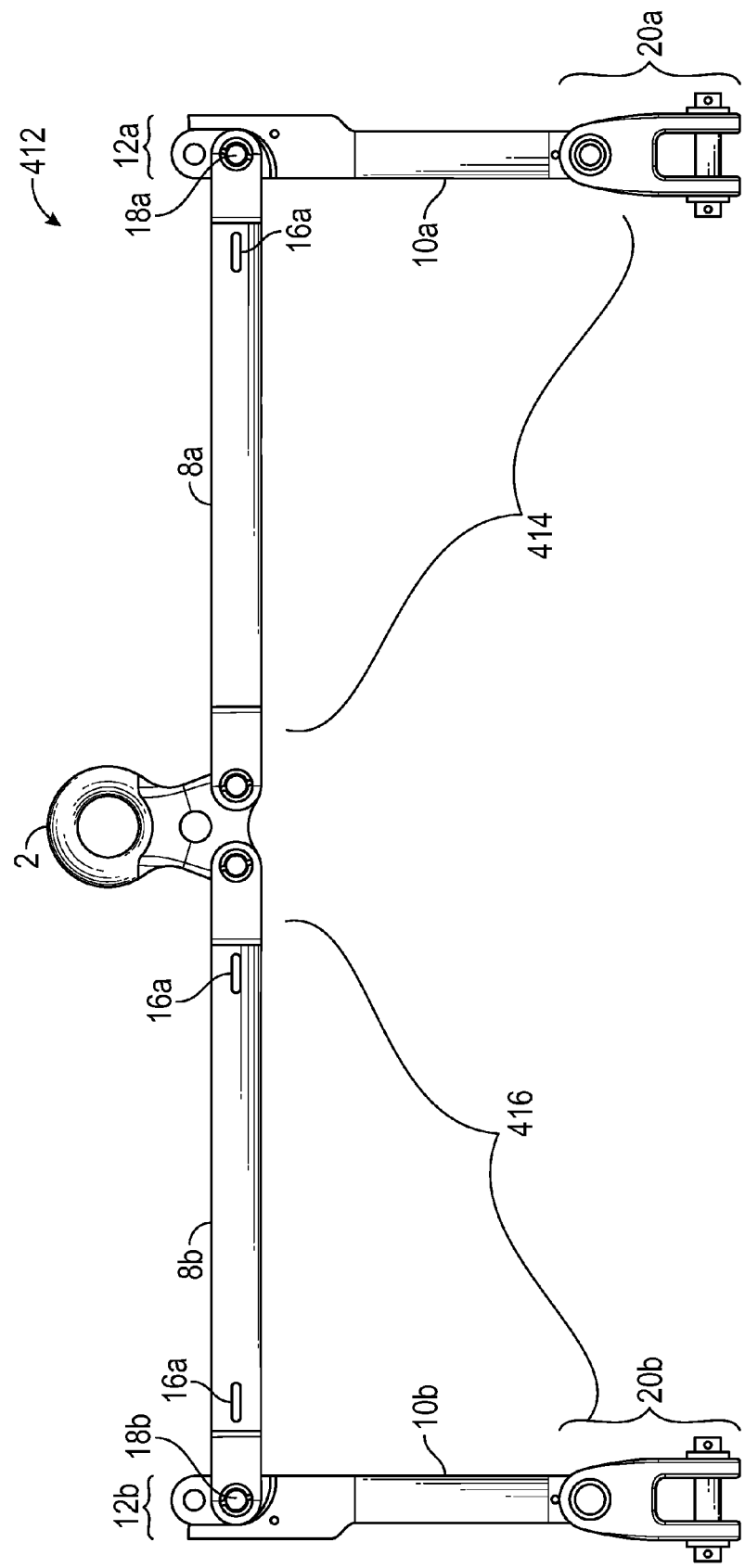
FIG. 4B is a top view of a fourth embodiment of the towing assembly in a partially folded position.

In a fourth embodiment, and as generally illustrated in FIG. 4B, which is most similar to the embodiment of FIGS. 1-3, towing assembly 412 includes member 416 comprising shaft 8b and shaft 10b joined by joint 12b, which joint 12b includes locking mechanism 16a, and member 414 comprising shaft 8a and shaft 10 joined by joint 12a. As shown, shafts 8a, 8b include locking mechanisms 16a that lock shafts 8a and 10a relative to each other, and 8b, 10b, relative to each other, respectively. In an optional variation of the fourth embodiment, shaft 8b and/or shaft 8a may be joined to lunette 2 by locking mechanism 16a. The various locking mechanisms 16 can be included with or excluded from, each of the shafts 8a, 8b, 10a, 10b, and joints 12a, 12b.

In a fifth embodiment, and as generally illustrated in FIG. 4C, towing assembly 413 includes member 417 comprising shaft 8b and shaft 10b joined by elbow 19, which elbow 19 receives locking mechanism 16a on leg 10b, and member 418 comprising shaft 8a and shaft 10a joined by elbow 19, which elbow 19 receives locking mechanism 16a on shaft 10a. In an optional variation of the fifth embodiment, shaft 8b and/or shaft 8a may be joined to lunette 2 by locking mechanism 16a. The various locking mechanism 16 can be included with or excluded from, each of the shafts 8a, 8b, 10a, 10b, joints 12a, 12b, and/or elbows 19.

Shafts 8a, 10a, 8b, 10b, may be joined to each other by a joint 12a, 12b, respectively, a two-hole, three-hole, or four-hole elbow 19, and/or a locking mechanism 16a, 16b, respectively. The locking mechanisms 16 may be mixed and matched as desired.

Figure 10:
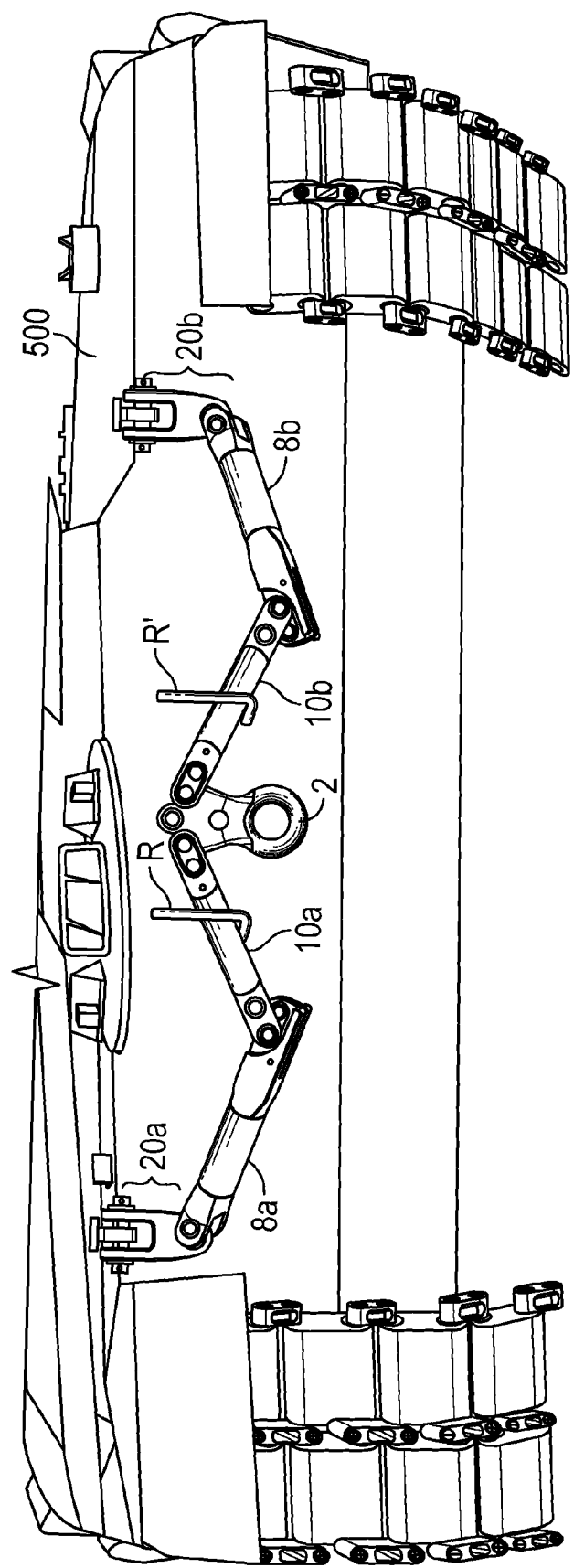
FIG. 10 is perspective view of the towing assembly of FIG. 1 attached to the front portion of a tank.

In another embodiment, and as generally illustrated in FIG. 10, the towing assembly may be attached to a tank 500. Shafts 8a, 8b may be tethered at one end to attachment mechanisms 20a and 20b, respectively. Shafts 10a, 10b are attached at one end to shafts 8a, 8b, respectively, and shafts 10a, 10b are connected at an opposite end to lunette 2. In an exemplary embodiment, the articulating shafts 10a, 10b are supported by brackets R and R' such that the towing assembly is not damaged by tank action.

Figure 5:
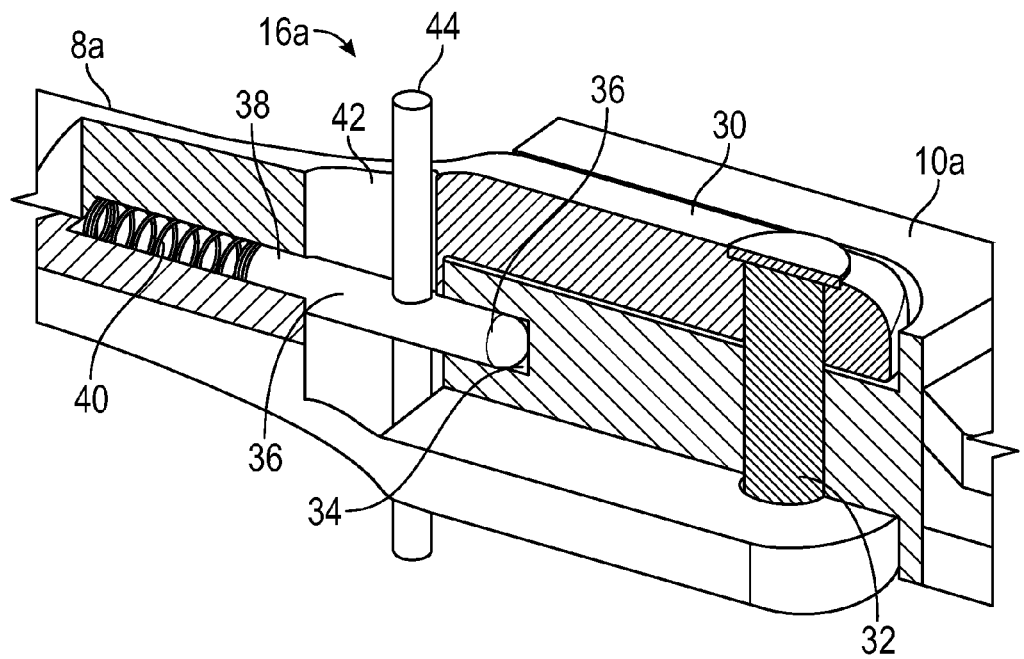
FIG. 5 is a magnified cut-away view of the towing assembly of FIG. 1A exposing the interior of the first shaft as the first shaft is detachably and pivotally coupled to the third shaft, illustrating a locking mechanism in a locked position.
Figure 8:
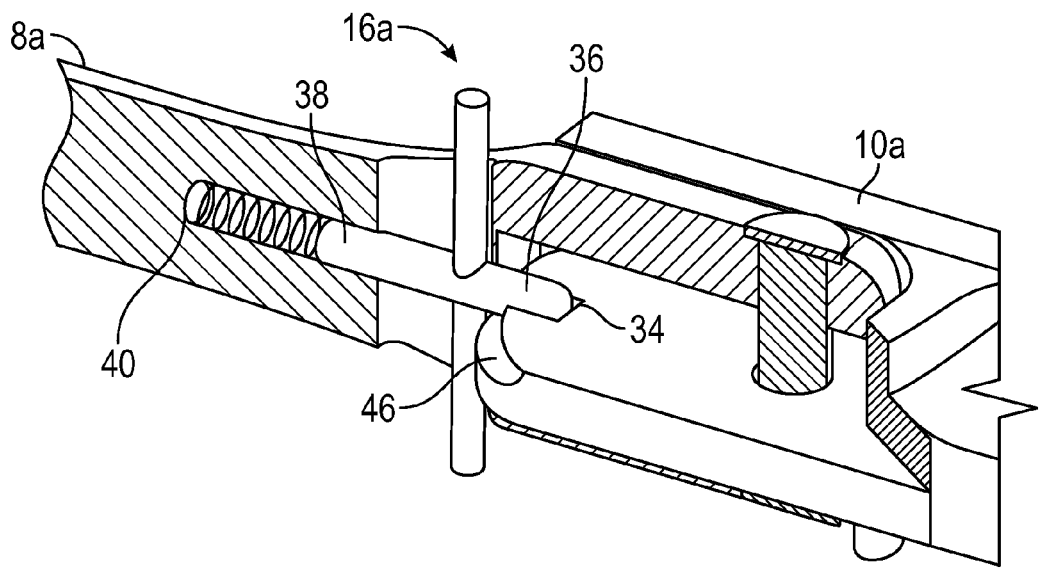
FIG. 8 is a magnified cut-away view of the towing assembly of FIG. 5 exposing the interior of the first shaft as the first shaft is detachably and pivotally coupled to the third shaft and in a third position, illustrating a locking mechanism in a locked position.

FIG. 5 depicts a second embodiment of the locking mechanism 16a, and a second embodiment of the joint 12a of assembly for towing 1. These embodiments of the locking mechanism 16a, and the joint 12a are configured for automatic locking (i.e., engagement with the joint 12a) whenever the corresponding and associated shafts 8a, 10a of the member 4a are aligned and relative one another (as is best seen in FIG. 1A and FIG. 8). This results in the corresponding and associated shafts 8a, 10a of the member 4a being held fixed in their relative alignment unless the locking mechanism 16a, is directly and/or remotely disengaged.

More specifically, FIG. 5 depicts a magnified cut-away view of the interior of shaft 8a of member 4a with a clevis termination 30 as it is detachably and pivotally coupled to the joint 12a by a pin 32. In one embodiment, the pin 32 is a threaded bolt having a nut/cap to secure it (as is depicted in FIG. 5). In other embodiments, the pin 32 may be a cotter pin or a bolt threaded into the joint itself. In still other embodiments, a spring loaded detent mechanism may be involved with the pin 32. In still other embodiments, the pin 32 may be a clevis pin having a clevis tang. Multiple types of the pin 32 may be used to detachably and pivotally couple the shaft 8a to the elbow joint 12a, as is well known to those skilled in the art.

The embodiment of the locking mechanism 16a shown in FIG. 5 is engaged with the joint 12a via a socket 34. The socket 34 is configured to receive and securely hold at least a portion of the locking mechanism 16a such that, when the locking mechanism 16a is engaged, the shaft 8a is held fixed in its alignment relative to the joint 12a. Although FIG. 5 depicts the socket 34 as a single relatively shallow cavity defined by the joint 12a, one of ordinary skill in the art understands that the socket 34 may involve more complex geometric/mechanical configurations.

The locking mechanism 16a of FIG. 5 engages with the socket 34 of the joint 12a via a bolt 36 that automatically, and retractably, extends out of the clevis termination 34 of the shaft 8a. More specifically, the automatic extension and retractable extension functions of bolt 36 are facilitated by a barrel 38, which holds and guides the bolt 36 as it extends or retracts, and a spring mechanism 40, which forces the bolt 36 to its fully extended position when the bolt 36 aligns with the socket 34. More specifically, the spring mechanism 40 is compressed during retraction of the bolt 36 into the barrel 38, and the spring mechanism 40 is uncompressed during the extension of the bolt 34 into the socket 34. Although FIG. 5 depicts the bolt 36 as a single cylindrical extension with a rounded tip, the bolt 36 may involve more complex geometric/mechanical configurations. If this is the case, then the socket 34 complements the bolt 36 such that the socket 34 remains mechanically operable.

At the junction between the clevis termination 30 and the shaft 8a is an aperture 42. The barrel 38 accesses the aperture 42 such that the bolt 36 extends across the aperture 42, preferably relative to the length of the aperture 42, for reception into the socket 34. A handle 44 is attached to the bolt 36, and the handle 44 projects perpendicularly from the bolt 34 through the aperture 42, such that at least a portion of the handle 44 extends out of the aperture 42 and is accessible from outside of the joint 12a, whereby a user can manipulate the handle 44 and thus the bolt 34. The aperture 42 defines a sufficient space to allow the handle 44 to be moved backwards towards the shaft 8a such that the bolt 36 may be disengaged from the socket 34, and forced deeper into the barrel 38, thus compressing the spring mechanism 40. As disengaging the bolt 36 from the socket 34 requires retraction of the bolt 36 into the barrel 38, the locking mechanism 16a is configured to automatically reengage with the socket 34, such as, for example, via the decompressing spring mechanism 40, whenever the shaft 8a is appropriately aligned with the joint 12a and the handle 44 is not receiving a disengaging force. In other words, the spring mechanism 40 forces the bolt 36 into the socket 34 when the bolt 36 aligns with the socket 34.

Although FIG. 5 depicts the aperture 42 as generally oval in shape, and proximate to the junction between the clevis termination 30 and the shaft 8a, aperture and/or the handle 44 may involve more complex geometric/mechanical configurations. Moreover, the aperture 42 may be positioned on the shaft 8a, accordingly, based on the specific configuration/complexity of the locking mechanism 16a being employed.

Figure 6:
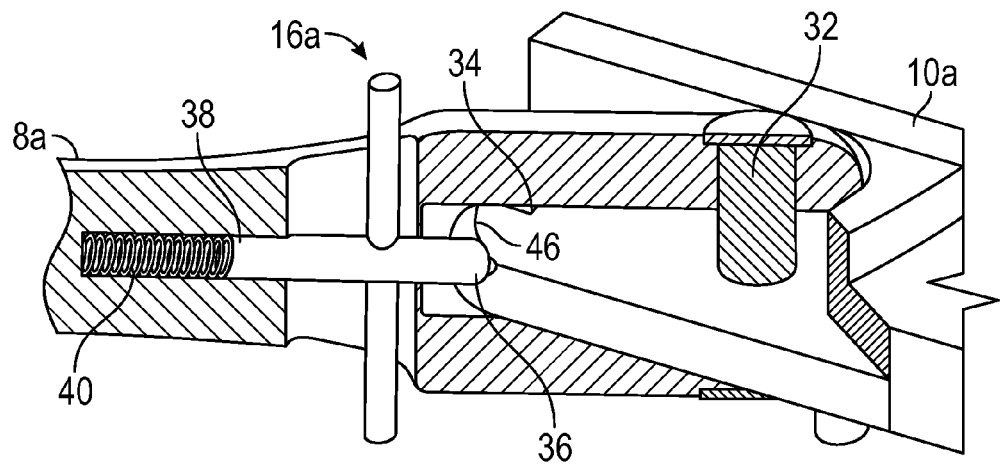
FIG. 6 is a magnified cut-away view of the towing assembly of FIG. 5 exposing the interior of the first shaft as the first shaft is detachably and pivotally coupled to the third shaft and in a first position, illustrating a locking mechanism in an unlocked position.

As shown in FIG. 6, a guide groove 46 can define an elongated recess along the surface of the joint 12a at the junction between the locking mechanism 16a and the joint 12a. More specifically, the guide groove 46 can define an elongated rounded/concave recess complementary of the rounded tip of the bolt 36. The guide groove 46 tapers towards the socket 34 such that a bolt 36 pushing against the guide groove 46 during articulation is guided into and would eventually access the socket 34, allowing the spring mechanism 40 to decompress, and fully extend towards a maximum length, so as to force bolt 36 into socket 34.

Therefore, when the locking mechanism 16a is disengaged from the socket 34, and the shaft 8a is articulating upon the joint 12a, the guide groove 46 is configured to channel the bolt 36 towards and away from the socket 34. Furthermore, the guide groove 46 is configured to minimize the resistance to articulation (e.g., friction) of the shaft 8a upon the joint 12a. Additionally, the guide groove 46 is configured to facilitate the automatic locking function of the locking mechanism 16a when the shaft 8a is appropriately aligned with the joint 12a, whereby the action of the decompressing spring mechanism 40 on the bolt 36 can assist in aligning the shaft 8a with the joint 12a such that the bolt 36 can access the socket 34.

Although FIG. 6 depicts the guide groove 46 as an elongated rounded/concave recess complementary of the rounded tip of the bolt 36, guide groove 46 may involve more complex geometric/mechanical configurations compatible with any other complex components of the towing assembly 1, e.g., multiple bolts 36, elaborate and complex automatic/automated locking mechanisms 16a, differently shaped joints 12a, differently terminated shafts 8a.

Figure 7:
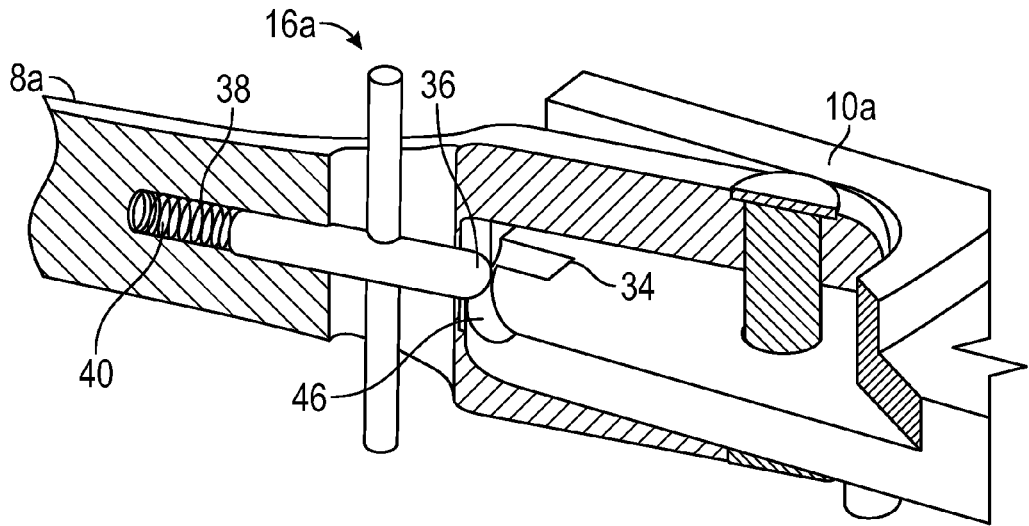
FIG. 7 is a magnified cut-away view of the towing assembly of FIG. 5 exposing the interior of the first shaft as the first shaft is detachably and pivotally coupled to the third shaft and in a second position, illustrating a locking mechanism in an unlocked position.

FIGS. 6-8 depict an embodiment of the articulation range available to the towing assembly 1 of FIG. 1. More specifically, the shaft 8a detachably and pivotally coupled to the joint 12a is shown transitioning from the disengaged position of FIG. 6 through the disengaged position of FIG. 7 to the engaged position of FIG. 8. Moreover, FIGS. 6-8 present cut-away views of the junction between the shaft 8a and the joint 12a as the locking mechanism 16a transitions through the positions.

In the position of FIG. 6 (a first position), the locking mechanism 16a is disengaged from the socket 38. The shaft 8a is articulating upon the joint 12a in a clockwise direction. The bolt 36 is being channeled by the guide groove 46 towards the socket 34. Because the guide groove 46 tapers towards the socket 34, the bolt 36 is pushing against the guide groove 46 as it begins to round the edge towards the socket 34. The bolt 36 is being maintained within the barrel 38, which compresses the spring mechanism 40.

In the position of FIG. 7 (a second position), the locking mechanism 16a is still disengaged from the socket 38; however, the shaft 8a is near appropriate alignment with the joint 12a for the locking mechanism 16a to automatically engage with the socket 34. The shaft 8a is still articulating upon the joint 12a in a clockwise direction. The bolt 36 is still being channeled by the guide groove 46 towards the socket 34. The bolt 36 still is pushing against the guide groove 46 as it begins to round towards the socket 34. The bolt 36 is still being maintained within the barrel 38, which compresses the spring mechanism 40.

In the position of FIG. 8 (a third position), the locking mechanism 16a is engaged with the socket 34 because the shaft 8a is appropriately aligned with socket 34 in the joint 12a. The appropriate alignment has allowed the compressed spring mechanism 40 to decompress, which fully extended the bolt 36 to its maximum position out of the barrel 38 and into the socket 34. Therefore, the locking mechanism 16a has automatically engaged with the socket 34.

The user can manipulate the handle 44 to disengage the bolt 36 from the socket 34 when releasing the locked towing assembly 1. For example, when the towing assembly 1 is in the articulated and locked position, with the shafts 8a and 10a, 8b and 10b aligned and bolt 36 extending into socket 34, spring mechanism maintains the bolt 36 within the socket 34. To unlock the towing assembly 1, the user can pull on the handle 44 in the direction that withdraws the bolt 36 from the socket 34, thus moving the bolt 36 out of the socket 36 and further into the barrel 83, thus compressing the spring mechanism 40. This disengages the bolt 36 from the socket 34 and unlocks the shafts 8a, 8b, 10a, 10b from the joint 12a, 12b, thereby allowing the towing assembly to de-articulate.

A locking mechanism comprising socket 34, bolt 36, barrel 38, spring mechanism 40, aperture 42, handle 44, and guide groove 46 can be incorporated in each part of the towing assembly 1, such as between each of shafts 8 and joints 12, and between each of shafts 10 and joints 12, whereby each of the shafts 8, 10 can be automatically locked to the joints 12. Additionally, locking mechanisms also can be incorporated between each of shafts 8 and hitch 2 whereby each of shafts 8 can be automatically locked to the hitch 2, and between each of shafts 10 and attaching mechanism 22 or attaching devices 24 each of shafts 10 can be automatically locked to the and attaching mechanism 22 or attaching devices 24.

Thus, the first means for fixing an orientation of said first and third shafts 8a, 10a in a locked position relative to each other is a first locking mechanism at least partially situated at the junction between the first shaft 8a and the first pivotable joint 12a, and at least partially embedded within the first shaft 8a; the second means for fixing an orientation of said second and fourth shafts 8b, 10b in a locked position relative to each other is a second locking mechanism at least partially situated at the junction between the second shaft 8b and the second pivotable joint 12b, and at least partially embedded within the second shaft 8b; the first and second shafts 8a, 8b each comprise a clevis termination 30 at the first and second pivotable joints 12a, 12b, respectively; the first and second pivotable joints 12a, 12b each additionally define an aperture 42, the aperture 42 configured to receive a clevis pin 36 traversing the clevis termination 30; the third and fourth shafts 10a, 10b each comprise a socket 34 for receiving the clevis pin 36; and each of the clevis pins 36 is movable from an unlocked position disengaged from the respective socket 34 to a locked position engaged with the respective socket 34.

Figure 9A:
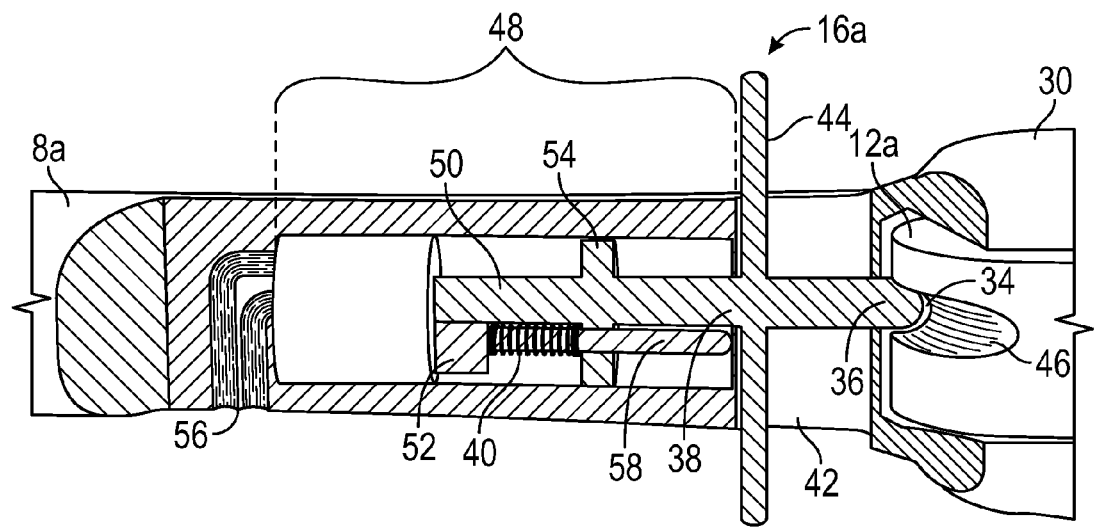
FIG. 9A is a first magnified sectional view of a towing assembly of FIG. 1 exposing the interior of the first shaft as the first shaft is detachably and pivotally coupled to the third shaft at a slotted joint, illustrating a powered locking mechanism in an unlocked position.
Figure 9B:
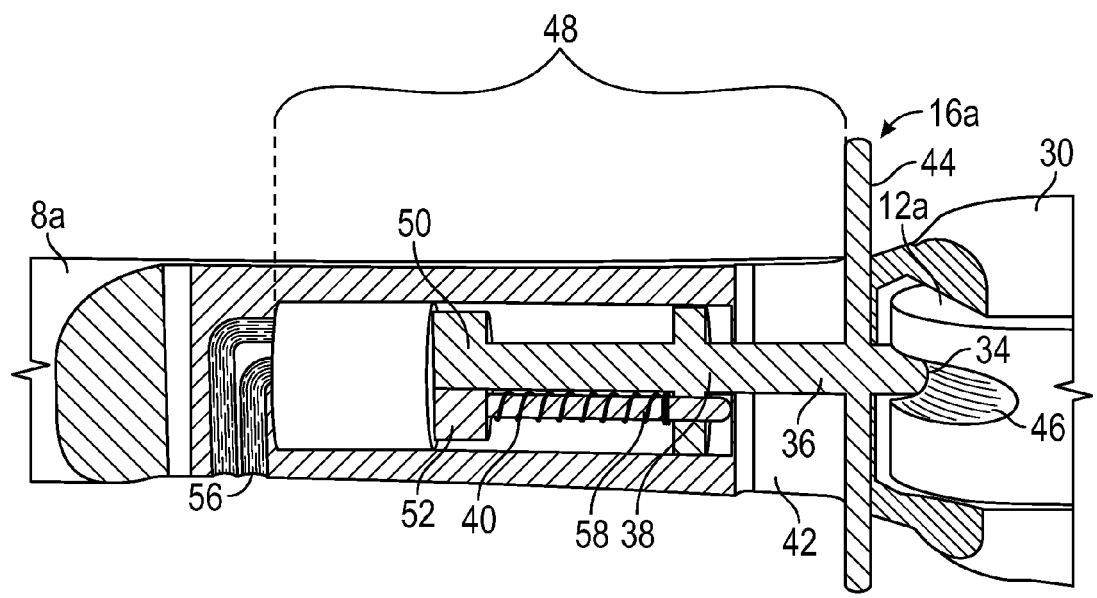
FIG. 9B is a second magnified sectional view of the towing assembly of FIG. 1 exposing the interior of the first shaft as the first shaft is detachably and pivotally coupled to the third shaft at a slotted joint, illustrating a powered locking mechanism in a locked position.

In another embodiment of locking mechanism 16a, FIG. 9A-9B depict a sectional view of the interior of shaft 8a of member 4a with a clevis termination 30 as it is detachably and pivotally coupled to the slotted joint 12a (only partially shown). In FIG. 9A, the bolt 36 of an automated locking mechanism 16a is disengaged from the socket 34 of the slotted joint 12a. In FIG. 9B, the bolt 36 of the automated locking mechanism 16a is engaged with the socket 34 of the slotted joint 12a. At the junction between the clevis termination 30 and the shaft 8a is an aperture 42. A handle 44 projects perpendicularly out from the bolt 36 through the length of the aperture 42, and at least a portion of the handle 44 extends out of the aperture 42. The automated locking mechanism 16a is configured to automatically, and retractably, extend out of the clevis termination 34 of the shaft 8a, as described for FIGS. 1-8. More specifically, the automatic extension and retractable extension functions of bolt 36 are facilitated by a barrel 38, which holds and guides the bolt 36 as it extends or retracts, and a spring mechanism 40, which forces the bolt 36 to its fully extended position whenever the spring mechanism 40 is compressed during retraction of the bolt 36 into the barrel 38.

The barrel 38 of the shaft 8a accesses the aperture 42 such that the bolt 36 may extend across the aperture 42 for reception into the socket 34 of the slotted joint 12a. The first component 50 of the automation mechanism 48 is configured to push/retract the bolt 36 across the aperture 42, that is, to slide the bolt 36 forwards without disturbing the relative position of the second component 52 of the automation mechanism 48, other than the spring mechanism 40 which would decompress.

The sliding block 54 of the automation mechanism 48 is configured to move laterally whenever the bolt 36 of the shaft 8a moves. For example, if the bolt 36 recedes into the barrel 38, then the sliding block 54 recedes with it compressing the spring mechanism 40 behind the sliding block 54. If the bolt 36, however, extends out of the barrel 38, then the sliding block 54 moves forward allowing the spring mechanism 40 to decompress.

Finally, the second component 52 of the automation mechanism 48 comprises an extension 58 holding the spring mechanism 40 behind the sliding block 54. The extension 58 traverses, via a mechanical restriction opening, the sliding block 54. The second component 52 is configured to push/retract the extension 58 through the sliding block 54. FIGS. 9A and 9B illustrate the extension 58 in its fully extended position. Because the sliding block 54 of the automation mechanism 48 allows the second component 52 to displace laterally relative to the first component 50 without disturbing the position of the first component 50, the second component 52 varies the compression of the spring mechanism 40 and, therefore, the spring force acting on the bolt 36. In one embodiment, the second component 52 leverages the spring mechanism 40, as would be understood by one having ordinary skill in the art, such that the second component 52 senses the amount of force acting on the bolt 36 as it articulates about the slotted joint 12a.

The first component 50 and/or the second component 52 of the automation mechanism 48 can be configured for hydraulic and/or electric automation controllable by a remote user. For example, the automation mechanism 48 may have known subcomponents configured for hydraulics, pneumatics, electromotives, Bowden cable mechanisms, mechanical motors/gears/pulleys, solenoids, etc. Of course, the bundle 56 may be of any type, variety or combination to provide the automation mechanism 48 with the necessary electrical, fluid, and/or mechanical power to operate the automation functions.

The automatic locking features disclosed in connection with the locking mechanism 16a and member 4a as drawn in FIGS. 5-9 also can be applied to locking mechanism 16b and member 4b. Similar locking mechanisms can be applied to any or all joints of towing assembly 1.

In use, when a tensile force is applied to said first shaft 8a, said second shaft 8b, said third shaft 10a, and said fourth shaft 10b, said first and said third shafts 8a, 10b are substantially aligned with each other in a linear manner and said second and said fourth shafts 8b, 10b are substantially aligned with each other in a linear manner, whereby the first and third shafts 8a, 10a are locked relative to each other in the linear manner, the second and fourth shafts 8b, 10b are locked relative to each other in the linear manner, the first shaft 8a is locked relative to the lunette 2, and the second shaft 8b is locked relative to the lunette 2.

18. The towing assembly of claim 17, further comprising an automation subcomponent selected from a group consisting of springs, hydraulics, pneumatics, and electromechanics, the automation subcomponent configured to move the clevis pin from the unlocked position to the locked position and from the locked position to the unlocked position.

Figure 11:
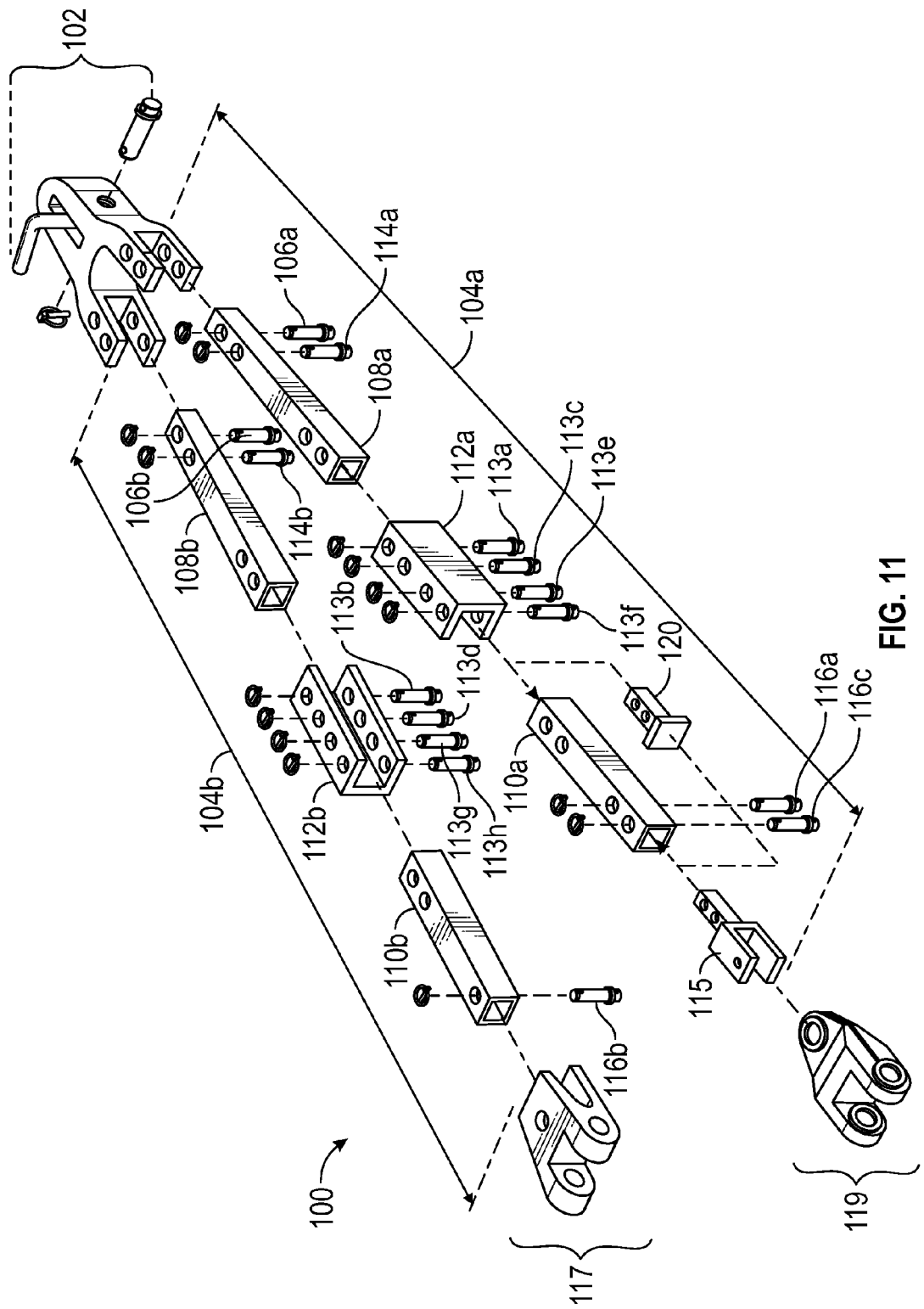
FIG. 11 is an exploded view of a sixth embodiment of the towing assembly comprising C-channel connector elbows in its extended position.

In another embodiment, the assembly for towing 100, as illustrated generally in FIG. 11, is for extracting an immobilized vehicle and then towing it. The towing assembly 100 is preferably made of steel or other high strength material(s), of either solid or hollow elements. The towing assembly comprises a hitch 102, e.g., a ball hitch. Alternatively, the hitch 102 may be of a toroidal shape for engagement with a pintle hook or tow ball (not shown) attached to a towing vehicle. The hitch 102 may be of a variety of types known in the art for such engagement. Attached to the hitch 102 are two members 104a, 104b. Members 104a, 104b are each pivotally attached to the hitch 102a by a pin 106a, 106b, respectively. In one embodiment, the pin 106 pivotally attaching the members 104a, 104b to the hitch 102 is a threaded bolt having a nut to secure it. In other embodiments, the pin 106 may be a cotter pin or a bolt threaded into the hitch 102 itself. In still other embodiments, a spring loaded detent mechanism may be used. Multiple types of attachments may be used to pivotally attach the members 104 to the hitch 102.

The two members 104a, 104b are preferably symmetrical with each other and accordingly member 104a has two shafts 108a, 110a with a joint 112a therebetween and member 104b has two shafts 108b, 110b with a joint 112b therebetween. It is the shafts 108a, 108b of members 104a, 104b, respectively, that are pivotally attached to the hitch 102. The orientation of the attachment of the members 104 to the hitch 102 may be fixed in place by a locking mechanism 114a and 114b, respectively. In one embodiment, the locking mechanism 114 fixing the orientation of the members 104 to the hitch 102 is a threaded bolt having a nut to secure it. In other embodiments, the locking mechanism 114 may be a cotter pin or a bolt threaded into the hitch 102 itself. In still other embodiments, the locking mechanism 114 and the joint 112 upon which it acts may be configured for a specialized automatic/automated locking mechanism. In still other embodiments, an automated mechanism can interact with the members 104a, 104b, and more specifically with the shafts 108a, 110a and 108b, 110b, for operating the towing assembly 100.

Each of the two sets of shafts 108a, 110a and 108b, 110b of each of the members 104a, 104b are attached to one another by the joint 112a, 112b, respectively. Typically referred to as an elbow joint by those skilled in the art, the joints 112a, 112b also may be used to lock the orientation of each of the respective sets of shafts 108a, 110a and 108b, 110b in an aligned position. In one embodiment, the locking joints 112a, 112b fixing the orientation of the shafts 108a, 110a and 108b, 110b to each other each may utilize, e.g., symmetrically spaced pairs of pins 113a, 113b; 113c, 113d; 113e, 113g; and 113f, 113h. In other embodiments, one or more pins 113 may be threaded bolts each having a nut to secure it. In yet other embodiments, the locking mechanism may be a cotter pin or a bolt threaded into the joint itself. Multiple types of locking mechanisms may be used to lock the orientation of the shafts 108a, 110a and 108b, 110b with each other.

The or each of the shafts 108a, 110a, 108b, 110b may be of hollow cross-section, for example, hollow square, hollow rectangle, or hollow circular cross section. Such hollow cross section may reduce the weight of the towing assembly 100, and retain the articulation of the towing assembly 100 as well as its towing capacity. Each shaft 108a, 110a, 108b, 110b may be of hollow cross-section along the entire length of the shaft 108a, 110a, 108b, 110b, or a portion thereof. In another embodiment, plug 120 may be fitted into one or both ends of each shaft 108a, 110a, 108b, 110b in order to reinforce the side walls of shafts 108a, 110a, 108b, 110b. The plug 120 may be manufactured such that the holes of the plug 120 and the pin holes on each shaft 108a, 110a, 108b, 110b are aligned.

In an embodiment, bumper attachment device 117 may be connected to shaft 110a and/or shaft 110b by use of a bolt (e.g., 116b) or other device known to those of skill in the art. Alternatively, connector 115 may be attached to an open end of shaft 110a and/or shaft 110b, and then connected to bumper attachment device 119.

The locking joints may be of C-channel construction, or C-cross-section. In this manner, the vertical member of the C-channel acts as a stop to movement of shafts 108a, 110a, 108b, 110b beyond a linear alignment position.

Although the particular embodiments shown and described above will prove to be useful in many applications in the towing art to which the present invention pertains, further modifications of the present invention will occur to persons skilled in the art. All such modifications are deemed to be within the scope and spirit of the present invention as defined by the appended claims.

What is claimed is:

1. A towing assembly, comprising:
a) a lunette;
b) a first shaft having a first end and a second end, the first shaft detachably and pivotally coupled at the first end to the lunette;
c) a second shaft having a first end and a second end, the first end of the second shaft having a locking joint portion bound by a shoulder feature, the second end of the first shaft detachably and pivotally coupled, directly, to the locking joint portion, the shoulder feature having a range of articulation for the first shaft about the locking joint portion;
d) a first means for fixing an orientation of the first shaft relative to the locking joint portion, and a second means for fixing an orientation of the first shaft relative to the lunette, whereby the first shaft and the second shaft are pivotable relative to each other about the locking joint portion in an unlocked position and the first shaft and the third shaft are not pivotable relative to each other in the locked position.

2. The towing assembly of claim 1, wherein:
the first means for fixing the orientation of the first shaft relative to the locking joint portion of the second shaft is a first locking mechanism at least partially situated at a junction between the first shaft and the locking joint portion;
the first shaft comprises a clevis termination at the second end of the first shaft; and
the first end of the second shaft additionally defines a traversing aperture, within the bounds of the shoulder feature, at the locking joint portion, the traversing aperture configured to receive a clevis pin,
whereby the first shaft and the second shaft are pivotable relative to each other about the locking joint portion based at least in part on a mechanical link between the clevis pin, the locking joint portion, and the first shaft.

3. The towing assembly of claim 1, wherein the first means for fixing the orientation of the first shaft relative to the locking joint portion is at least partially situated at a junction between the second end of the first shaft and the locking joint portion.

4. The towing assembly of claim 1, wherein the first means for fixing the orientation of the first shaft relative to the locking joint portion is at least partially situated at a junction between the second end of the first shaft and the locking joint portion, and at least partially embedded within the second end.

5. The towing assembly of claim 1, wherein the first means for fixing the orientation of the first shaft relative to the locking joint portion is at least partially situated at a junction between the second end of the first shaft and the locking joint portion, at least partially embedded within the second end, and at least partially received by the first end of the second shaft when in the locked position.

6. The towing assembly of claim 1, wherein the locking joint portion comprises a socket, and the first means for fixing the orientation of the first shaft relative to the locking joint portion comprises a bolt, the socket configured to receive the bolt.

7. The towing assembly of claim 1, wherein:
the locking joint portion comprises a socket, and the first means for fixing the orientation of the first shaft relative to the locking joint portion comprises a bolt, the socket configured to receive the bolt; and
the locking joint portion further comprises a surface feature configured to:
minimize a resistance to articulation of the second end of the first shaft when the first shaft pivots towards the orientation; and
facilitate engagement of the bolt within the socket whenever the shaft obtains the orientation.

8. The towing assembly of claim 7, wherein the surface feature of the locking joint portion is at least partially situated along the point of contact between the bolt and the locking joint portion.

9. A towing assembly, comprising:
a) a lunette;
b) a first shaft having a first end and a second end, the first shaft detachably and pivotally coupled at the first end to the lunette;
c) a second shaft having a first end and a second end, the first end of the second shaft having an elbow joint portion bound by a shoulder feature, the second end of the first shaft detachably and pivotally coupled, directly, to the elbow joint portion, the shoulder feature having a range of articulation for the first shaft about the elbow joint portion; and d) a means for locking in place a specific orientation and alignment of the first shaft and second shaft relative to the lunette, whereby the first shaft and the second shaft are pivotable relative to each other about the elbow joint portion when the means for locking in place is disengaged, and the first shaft and the second shaft are not pivotable relative to each other about the elbow joint portion when the means for locking in place is engaged.

10. The towing assembly of claim 9, wherein the elbow joint portion comprises a socket, and the means for locking in place the specific orientation and alignment comprises a bolt, the socket configured to receive the bolt when the means for locking in place is engaged.

11. The towing assembly of claim 10, wherein the elbow joint portion further comprises a surface feature configured to:
    minimize a resistance to articulation of the second end of the first shaft when the first shaft pivots towards the specific orientation and alignment; and
    facilitate engagement of the means for locking in place.

12. The towing assembly of claim 11, wherein the surface feature is at least partially situated along the point of contact between the means for locking in place the specific orientation and alignment and the elbow joint portion.

13. The towing assembly of claim 9, wherein the elbow joint portion defines a first traversing aperture configure to receive a pin, and the pin mechanically links the second end of the first shaft to the elbow joint portion by extending through the first traversing aperture.

14. The towing assembly of claim 13, wherein the means for locking in place the specific orientation and alignment comprises a bolt, and the elbow joint portion comprises a socket configured to receive the bolt.

15. The towing assembly of claim 14, wherein the elbow joint portion further defines a second traversing aperture also configure to receive a pin.

16. The towing assembly of claim 14, wherein the elbow joint portion further defines a second traversing aperture and a third traversing aperture each, respectively, configured to receive a pin, and each aligned with the other and the first traversing aperture.

17. A towing assembly, comprising:
    a) a hitch;
    b) a first shaft having a first end and a second end, the first shaft detachably and pivotally coupled at the first end to the hitch, the second end having a clevis termination;
    c) a second shaft having a first end and a second end, the first end of the second shaft having a joint portion bound by a shoulder feature, the joint portion having a first traversing aperture configured to receive a clevis pin, the clevis termination of the first shaft detachably and pivotally coupled directly to the joint portion, via the clevis pin, the shoulder feature having a range of articulation for the first shaft about the joint portion; and
    d) a means for locking in place an orientation of the first shaft relative to the joint portion.

18. The towing assembly of claim 17, wherein the means for locking in place the orientation of the first shaft relative to the joint portion is at least partially situated at a junction between the clevis termination, of the first shaft, and the joint portion.

19. The towing assembly of claim 17, wherein the means for locking in place the orientation of the first shaft relative to the joint portion is at least partially situated at a junction between the clevis termination, of the first shaft, and the joint portion, and at least partially embedded within the second end of the first shaft.

20. The towing assembly of claim 17, wherein the means for locking in place the orientation of the first shaft relative to the joint portion is at least partially situated at a junction between the clevis termination, of the first shaft, and the joint portion; at least partially embedded within the second end of the first shaft; and at least partially received by the first end of the second shaft.

21. The towing assembly of claim 17, wherein:
    the joint portion of the second shaft further comprises a second traversing aperture configure to receive a pin; and
    the means for locking in place the orientation of the first shaft relative to the joint portion comprises a pin extending through the second traversing aperture.

22. The towing assembly of claim 17, wherein:
    the means for locking in place the orientation of the first shaft relative to the joint portion comprises a bolt; and
    the joint portion of the second shaft further defines a second traversing aperture configured to receive a pin, the joint portion comprising a socket configured to receive the bolt.

23. The towing assembly of claim 22, wherein the means for locking in place the orientation of the first shaft relative to the joint portion comprises a pin extending through the second traversing aperture.

24. The towing assembly of claim 17, wherein the joint portion of the second shaft further defines a second traversing aperture and a third traversing aperture each, respectively, configured to receive a pin, and each aligned with the other and the first traversing aperture.

25. The towing assembly of claim 24, wherein the means for locking in place the orientation of the first shaft relative to the joint portion comprises a bolt, and the joint portion of the second shaft further comprises a socket configured to receive the bolt.

26. A towing assembly, comprising:
    a) a first shaft detachably and pivotally coupled to an elbow joint portion of a second shaft, the second shaft terminated at one end by the elbow joint portion, the elbow joint portion bound by a shoulder feature, the shoulder feature having a range of articulation for the first shaft about the elbow joint portion; and
    b) a locking mechanism configured to hold fixed a specific orientation and alignment of the first shaft, relative to the second shaft, whenever the locking mechanism is engaged,
    wherein the first shaft is configured to articulate about the elbow joint portion, along the range, whenever the automatic locking mechanism is disengaged.

27. The towing assembly of claim 26, wherein the locking mechanism is at least partially situated at a junction between the first shaft and the elbow joint portion.

28. The towing assembly of claim 26, wherein the locking mechanism is at least partially situated at a junction between the first shaft and the elbow joint portion, and at least partially embedded within the first shaft.

29. The towing assembly of claim 26, wherein the locking mechanism is at least partially situated at a junction between the first shaft and the elbow joint portion, at least partially embedded within the first shaft, and at least partially received by the elbow joint portion, when engaged.

30. The towing assembly of claim 26, wherein the elbow joint portion comprises a socket, and the locking mechanism comprises a bolt, the socket configured to receive the bolt when the locking mechanism is engaged.

31. The towing assembly of claim 26, wherein:
the elbow joint portion comprises a socket, and the locking mechanism comprises a bolt, the socket configured to receive the bolt; and
the elbow joint portion further comprises a surface feature configured to:
minimize a resistance to articulation of the first shaft when the first shaft pivots towards the specific orientation and alignment; and
facilitate engagement of the bolt within the socket when the locking mechanism is engaged.

32. The towing assembly of claim 31, wherein the surface feature is at least partially situated along the point of contact between the bolt and the elbow joint portion.

33. The towing assembly of claim 26, wherein the elbow joint portion defines a first traversing aperture configure to receive a pin, and the pin mechanically links the first shaft to the elbow joint portion by extending through the first traversing aperture.

34. The towing assembly of claim 33, wherein:
the locking mechanism comprises a bolt; and
the elbow joint portion comprises a socket configured to receive the bolt.

35. The towing assembly of claim 33, wherein the elbow joint portion further defines a second traversing aperture also configured to receive a pin, and the locking mechanism comprises a pin extending through the second traversing aperture.

36. The towing assembly of claim 33, wherein:
the locking mechanism comprises a bolt; and
the elbow joint portion further defines a second traversing aperture configured to receive a pin, the elbow joint portion comprising a socket configured to receive the bolt.

37. The towing assembly of claim 33, wherein the elbow joint portion further defines a second traversing aperture and a third traversing aperture each, respectively, configured to receive a pin, and each aligned with the other and the first traversing aperture.

38. A towing assembly, comprising:
a) a first shaft detachably and pivotally coupled to a joint portion of a second shaft, the second shaft terminated at one end by the joint portion, the joint portion bound by a shoulder feature, the shoulder feature having a range of articulation for the first shaft about the joint portion; and
b) an automatic locking mechanism configured to:
hold fixed a specific orientation and alignment of the first shaft, relative to the second shaft, whenever the automatic locking mechanism is engaged; and
automatically engage whenever the specific orientation and alignment of the first shaft, relative to the second shaft, is obtained,
wherein the first shaft is configured to articulate about the joint portion, along the range, whenever the automatic locking mechanism is disengaged.

39. The towing assembly of claim 38, wherein the joint portion comprises a socket, and the automatic locking mechanism comprises a bolt, the socket configured to receive the bolt when the automatic locking mechanism is engaged.

40. The towing assembly of claim 38, wherein the joint portion further comprises a surface feature configured to:
minimize a resistance to articulation of the first shaft when the first shaft pivots towards the specific orientation and alignment; and
facilitate engagement of the automatic locking mechanism.

41. The towing assembly of claim 40, wherein the surface feature is at least partially situated along the point of contact between the automatic locking mechanism and the joint portion.

42. The towing assembly of claim 38, wherein the joint portion defines a first traversing aperture configure to receive a pin, and the pin mechanically links the first shaft to the joint portion by extending through the first traversing aperture.

43. The towing assembly of claim 42, wherein the automatic locking mechanism comprises a bolt, and the joint portion comprises a socket configured to receive the bolt when the automatic locking mechanism is engaged.

44. The towing assembly of claim 43, wherein the joint portion further defines a second traversing aperture also configure to receive a pin.

45. The towing assembly of claim 43, wherein the joint portion further defines a second traversing aperture and a third traversing aperture each, respectively, configured to receive a pin, and each aligned with the other and the first traversing aperture.

\* \* \* \* \*